United States Patent
Long et al.

(10) Patent No.: US 8,906,501 B2
(45) Date of Patent: Dec. 9, 2014

(54) $RUO_2$ COATINGS

(75) Inventors: Jeffrey W Long, Alexandria, VA (US); Jeffrey C Owrutsky, Silver Spring, MD (US); Christopher N. Chervin, Washington, DC (US); Debra R Rolison, Arlington, VA (US); Joseph S. Melinger, Bethesda, MD (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 2 days.

(21) Appl. No.: 12/954,800

(22) Filed: Nov. 26, 2010

(65) Prior Publication Data

US 2011/0091723 A1 Apr. 21, 2011

Related U.S. Application Data

(63) Continuation-in-part of application No. 12/245,978, filed on Oct. 6, 2008.

(60) Provisional application No. 60/977,685, filed on Oct. 5, 2007, provisional application No. 61/264,967, filed on Nov. 30, 2009.

(51) Int. Cl.
*B32B 5/00* (2006.01)
*B32B 9/04* (2006.01)
*B05D 3/02* (2006.01)
*C01G 55/00* (2006.01)
*C09D 7/00* (2006.01)
*B82Y 30/00* (2011.01)
*C23C 18/12* (2006.01)

(52) U.S. Cl.
CPC ............ *C23C 18/1216* (2013.01); *B82Y 30/00* (2013.01); *C23C 18/1225* (2013.01); *C23C 18/1245* (2013.01); *C23C 18/1283* (2013.01); *C23C 18/1291* (2013.01); *Y10S 977/773* (2013.01)
USPC ... 428/336; 428/702; 423/592.1; 106/287.18; 977/773

(58) Field of Classification Search
None
See application file for complete search history.

(56) References Cited

U.S. PATENT DOCUMENTS 4,000,346 A 12/1976 Dowell
5,358,889 A 10/1994 Emesh et al.
(Continued)

FOREIGN PATENT DOCUMENTS

JP 2003187643 A 7/2003

OTHER PUBLICATIONS

Kim et.al. Electrochemical and Solid State Letters, 8, (7), 2005, 369-372.*
Kim et al. J. Electrochemical Soc. 152, (11), 2005, 2170-2178.*

(Continued)

*Primary Examiner* — Vera Katz
(74) *Attorney, Agent, or Firm* — US Naval Research Laboratory; Joseph T. Grunkemeyer

(57) ABSTRACT

Disclosed herein is an article having: a substrate and a $RuO_2$ coating having nanoparticles of $RuO_2$. Also disclosed herein is an article having: a substrate and a $RuO_2$ coating. The coating is made by: immersing the substrate in a solution of $RuO_4$ and a nonpolar solvent at a temperature that is below the temperature at which $RuO_4$ decomposes to $RuO_2$ and warming the substrate and solution to ambient temperature under ambient conditions to cause the formation of the coating.

8 Claims, 5 Drawing Sheets

(56) References Cited

U.S. PATENT DOCUMENTS

| | | | |
|---|---|---|---|
| 6,060,154 A * | 5/2000 | Adachi et al. | 428/323 |
| 6,649,211 B2 | 11/2003 | Lyons et al. | |
| 6,670,301 B2 | 12/2003 | Adzic et al. | |
| 7,005,391 B2 * | 2/2006 | Min et al. | 438/778 |
| 7,291,392 B2 * | 11/2007 | Naoi et al. | 428/403 |
| 2003/0124467 A1 * | 7/2003 | Minami et al. | 430/321 |
| 2006/0001069 A1 * | 1/2006 | Tomonaga et al. | 257/306 |
| 2007/0190362 A1 | 8/2007 | Weidman | |
| 2009/0092834 A1 | 4/2009 | Rolison et al. | |
| 2009/0269667 A1 | 10/2009 | Antonietti et al. | |

OTHER PUBLICATIONS

Merriam Webster's Collegiate Dictionary, $10^{th}$ Edition, 1996, p. 506.*

Search Report and Written Opinion in PCT/US2010/058147 (Jan. 24, 2011).

Armelao et al., "A molecular approach to $RuO_2$-based thin films: sol-gel synthesis and characterisation" J. Non-Crystalline Solids, 316, 364-371 (2003).

Chervin et al., "Making the Most of a Scarce Platinum-Group Metal: Conductive Ruthenia Nanoskins on Insulating Silica Paper" Nano Lett., 9, 2316-2321 (2009).

Gujar et al., "Spray deposited amorphous $RuO_2$ for an effective use in electrochemical supercapacitor" Electrochem. Commun., 9, 504-510 (2007).

Hara et al., "Preparation of Transparent Conductive $RuO_2$ Thin Film from its Precursor Solution" Electrochemistry, 70, 13-17 (2002).

Hones et al,. "Spectroscopic ellipsometry of $RuO_2$ films prepared by metalorganic chemical vapor deposition" Appl. Phys. Lett., 67, 3078-3080 (1995).

Liao et al., "Characterizatior of $RuO_2$ thin films deposited on Si by metal-organic chemical vapor deposition" Thin Solid Films, 287, 74-79 (1996).

Mar et al., "Characterization of $RuG_2$ thin films by Raman spectroscopy" Appl. Surf. Sci., 90, 497-504 (1995).

Mondio et al., "Energy loss spectroscopy of $RuO_2$ thin films" J. Appl. Phys., 82, 1730-1735 (1997).

Ryan et al., "Electronic connection to the interior of amesoporous insulator with nanowires of crystalline $RuO_2$" Nature, 406, 169-172 (2000).

Swider-Lyons et al., "Selective Vapor Deposition of Hydrous $RuO_2$ Thin Films" J. Electrochem. Soc., 152, C158-C162 (2005).

Office Action in JP2012-541217 (Oct. 18, 2013).

Chervin et al., "Effect of temperature and atmosphere on the conductivity and electrochemical capacitance of single-unit-thick ruthenium dioxide" J. Electroanal. Chem. 644 (2010) 155-163.

Godoi et al., "Effects of Alloyed and Oxide Phases on Methanol Oxidation of Pt—Ru/C Nanocatalysts of the Same Particle Size" J. Phys. Chem. C 2009, 113, 8518-8525.

Li et al., "Catalytic oxidation of methanol on molybdate-modified platinum electrode in sulfuric acid solution" J. Power Sources 104 (2002) 281-288.

Long et al., "How to Make Electrocatalysts More Active for Direct Methanol OxidationsAvoid PtRu Bimetallic Alloys!" J. Phys. Chem. B 2000, 104, 9772-9776.

Park et al., "Electrocatalytic Enhancement of Methanol Oxidation at Pt—WOx Nanophase Electrodes and In-Situ Observation of Hydrogen Spillover Using Electrochromism" J. Phys. Chem. B 2003, 107, 4352-4355.

Penner, "Mesoscopic Metal Particles and Wires by Electrodeposition" J. Phys. Chem. B 2002, 106, 3339-3353.

Pietron et al., "Direct methanol oxidation at low overpotentials using Pt nanoparticles electrodeposited at ultrathin conductive $RuO_2$ nanoskins" J. Mater. Chem., 2012, 22, 5197.

Profeti et al., "Pt—$RuO_2$ electrodes prepared by thermal decomposition of polymeric precursors as catalysts for direct methanol fuel cell applications" Int. J Hydrogen Energy, 34(2009)2747-2757.

Rolison et al., "Role of Hydrous Ruthenium Oxide in Pt—Ru Direct Methanol Fuel Cell Anode Electrocatalysts: The Importance of Mixed Electron/Proton Conductivity" Langmuir 1999, 15, 774-779.

Shen et al., "CO Oxidataion on Pt—Ru/$WO_3$ Electrodes" J. Electrochem. Soc. 142 (1995) L85-L86.

Shukla et al., "Methanol electrooxidation on carbon-supported Pt—$WO_{3-x}$ electrodes in sulphuric acid electrolyte" J. Appl. Electrochem. 25 (1995)528-532.

Suffredini et al., "Sol-gel method to prepare active Pt—$RuO_2$ coatings on carbon powder for methanol oxidation" Electrochemistry Communications 6 (2004) 1025-1028.

Suffredini et al., "Electro-oxidation of methanol and ethanol using a Pt—$RuO_2$/C composite prepared by the sol-gel technique and supported on boron-doped diamond" Journal of Power Sources 158 (2006) 124-128.

Villullas et al., "Electrochemical Oxidation of Methanol on Pt Nanoparticles Dispersed on $RuO_2$" J. Phys. Chem. B 2004, 108, 12898-12903.

Villullas et al., "Sol-Gel Prepared Pt-Modified Oxide Layers: Synthesis, Characterization, and Electrocatalytic Activity" Chem. Mater. 2006, 18, 5563-5570.

Zhang et al., "Electrochemically Codeposited Platinum/Molybdenum Oxide Electrode for Catalytic Oxidation of Methanol in Acid Solution" Electrochemical and Solid-State Letters, 2 (9) 437-439 (1999).

Search Report and Written Opinion in SG Appl. No. 201203116-7 (Aug. 9, 2013).

* cited by examiner

RUO₂ COATINGS

This application claims the benefit of U.S. Provisional Application No. 61/264,967, filed on Nov. 30, 2009. This application is a continuation-in-part application of pending U.S. patent application Ser. No. 12/245,978, filed on Oct. 6, 2008, which claims the benefit of U.S. Provisional Application No. 60/977,685, filed on Oct. 5, 2007. These applications and all other publications and patent documents referred to throughout this nonprovisional application are incorporated herein by reference.

TECHNICAL FIELD

The present disclosure is generally related to coatings of ruthenium dioxide ($RuO_2$).

DESCRIPTION OF RELATED ART

Transparent conducting materials play a critical role in many technologically important applications such as photovoltaics and light-emitting diodes (LEDs). Materials that are simultaneously conducting and transparent are relatively rare; known examples include certain doped or mixed-metal oxides (commonly based on tin oxides), carbon-based materials (e.g., graphene and nanotubes, when prepared as thin films), doped polymers, and layered films of insulators and conductors. By far the most widely used and commercially available type of transparent conductor is indium-tin oxide (ITO), which is typically produced by chemical vapor deposition (CVD) or sputtering. In order to simultaneously achieve both good conductivity and transparency with ITO and related materials such as fluorine-doped tin oxide (FTO), the doping level and oxide stoichiometry must be carefully controlled. Indium-tin oxide is transparent in the visible but reflective at longer wavelength in the infrared. The optical constants of materials such as ITO are well known, to the point that computational methods are successful at predicting the optical and electrical properties as a function of doping and thickness. Because CVD or sputtering is used to fabricate ITO and related transparent conducting oxides, it is often difficult to adapt these fabrication methods to coat textured or complex substrates, and ITO is usually available or produced only on relatively flat surfaces.

Carbon-based materials, in particular carbon nanotubes and graphene, are conducting materials that when expressed as ultrathin films are transparent not only in the visible but also in the infrared. These films can be challenging to fabricate with favorable properties for transparent conduction and are not currently amenable to coating structured substrates. Doped polymer and insulator-metal-insulator (IMI) coatings are also being explored but only afford advantages for niche applications.

A method to deposit self-wired networks of nanoscopic $RuO_2$ onto electrically and electrochemically inert substrates such as mesoporous, high-surface-area $SiO_2$ aerogels (Ryan et al., *Nature* 406 (2000) 169-172; U.S. Pat. Nos. 6,290,880 and 6,649,091) or macroporous $SiO_2$ filter papers (Chervin et al., *Nano Lett.* 9 (2009) 2316-2321; US Patent Application Publication No. 2009/0092834) has been demonstrated. The $RuO_2$ nanoparticles form a ~2-nm-thick, through-connected network on substrates of high curvature (Ryan) or contiguous shell on substrates of low curvature, such as the >100-nm diameter fibers in silica-fiber paper (Chervin). In the latter, the resulting $RuO_2(SiO_2)$ paper contains ~300 μg cm$^{-2}$ of 2-3-nm $RuO_2$ nanoparticles that occupy only 0.1 vol % of the total object, yet the paper displays a geometry-normalized conductivity of ~0.5 cm$^{-1}$ after heat treatment in air. The $RuO_2(SiO_2)$ paper also expresses large electrochemical capacitance (>600 F g$^{-1}$ as normalized to the mass of $RuO_2$) and high surface area of the conductive phase (~90 m² g$^{-1}$) indicating that a majority of the deposited $RuO_2$ is connected within the electronic circuit and electrochemically addressable, thereby optimizing utilization of this expensive component.

BRIEF SUMMARY

Disclosed herein is an article comprising: a substrate; and a $RuO_2$ coating on a portion of the substrate. The coating comprises nanoparticles of $RuO_2$.

Also disclosed herein is an article comprising: a substrate; and a $RuO_2$ coating on a portion of the substrate. The coating is made by a method comprising: immersing the substrate in a solution of $RuO_4$ and a nonpolar solvent at a temperature that is below the temperature at which $RuO_4$ decomposes to $RuO_2$ in the nonpolar solvent in the presence of the substrate; and warming the substrate and solution to ambient temperature under ambient conditions to cause the formation of the coating.

BRIEF DESCRIPTION OF THE DRAWINGS

A more complete appreciation of the invention will be readily obtained by reference to the following Description of the Example Embodiments and the accompanying drawings.

DETAILED DESCRIPTION OF EXAMPLE EMBODIMENTS

Figure 1:
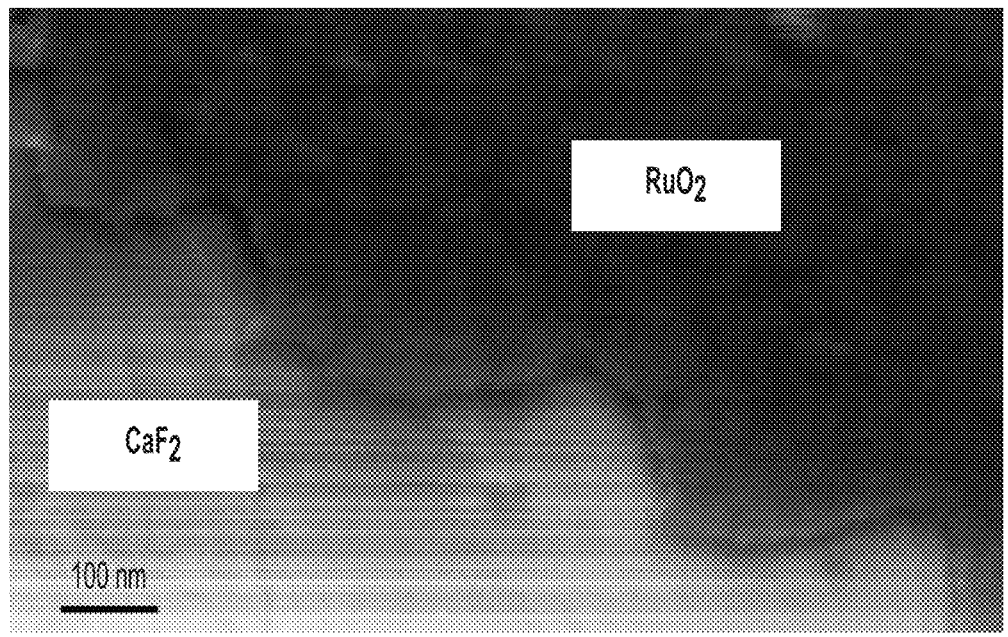
FIG. 1 shows electron micrographs of 2-3-nm-thick films of $RuO_2$ deposited on planar $CaF_2$ (top) and Si (bottom). The coatings were heated to 200° C. in air after deposition.
Figure 1:
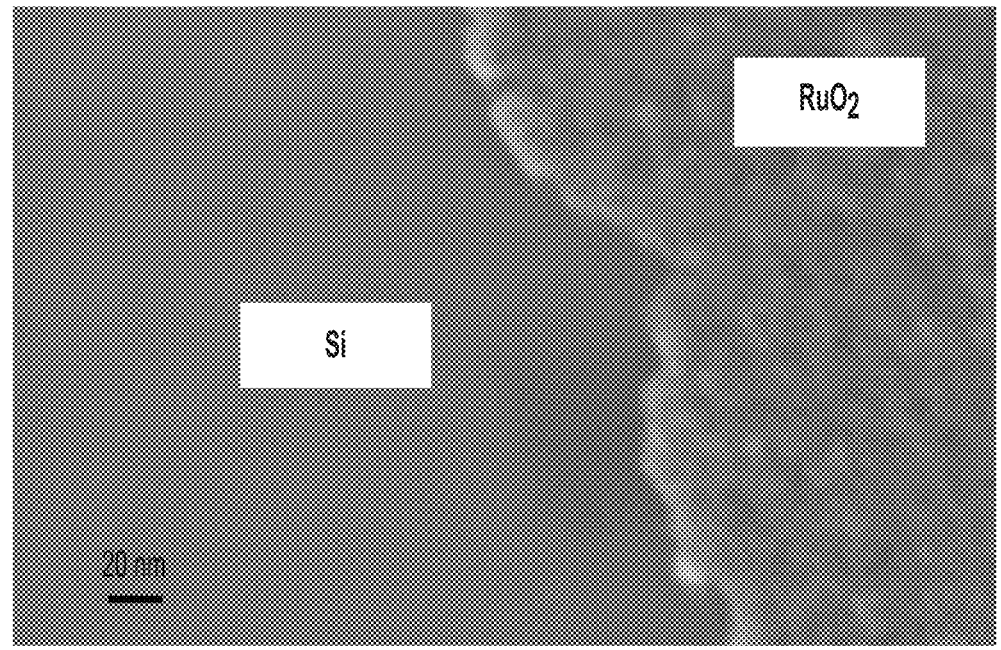
Figure 2:
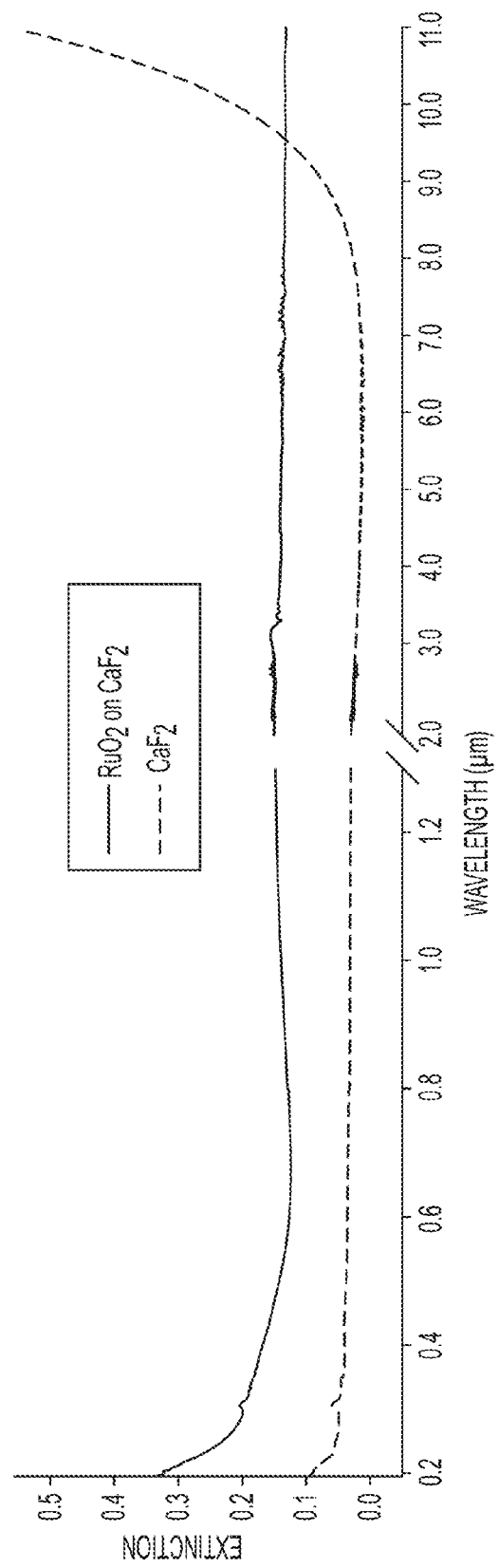
FIG. 2 shows extinction (equal to $\log(1/T)$), where T is transmitted intensity, $T=I/I_o$) spectra for a single 2-3-nm-thick film of $RuO_2$ on a planar $CaF_2$ substrate. The solid line is the coated substrate (with the $CaF_2$ extinction subtracted) and the dashed line is an uncoated $CaF_2$ sample.
Figure 3:
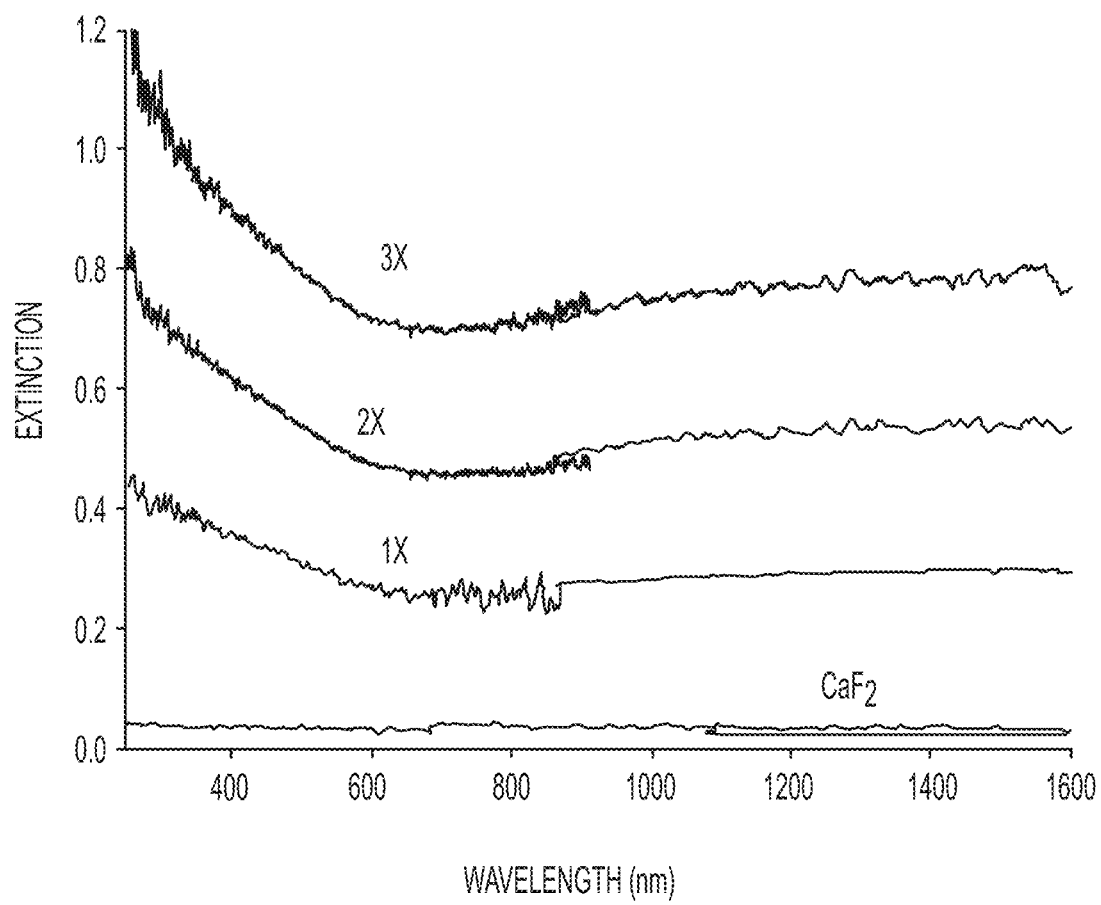
FIG. 3 shows extinction spectra in the UV to near-infrared regions for 1, 2 and 3 layers of $RuO_2$ on (both sides of) $CaF_2$. The bottom line is the $CaF_2$ substrate before coating.

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

Disclosed are ultrathin (e.g., 2-10 nm), transparent, conducting films of ruthenium dioxide, $RuO_2$, fabricated via the self-limiting, subambient thermal decomposition of ruthenium tetroxide from organic solution onto substrates, including but not limited to dielectric, insulating substrates. Further thermal treatments of as-deposited films can yield $RuO_2$ coatings with conductivities on the order of 10³ S cm$^{-1}$ and these conducting films simultaneously exhibit a spectrally broad (ultraviolet to THz) optical transmission of >85% (corresponding to an absorbance of <0.13 OD). The solution-based deposition method used to prepare these $RuO_2$ films may be simple and economical compared to methods for producing typical transparent conductors that rely on doping or composites and chemical vapor deposition or vacuum-deposition methods. The approach provides transparent conducting films that conformally coat a wide range of substrates ranging from planar to complex 3-D morphologies. A potential practical advantage is that the $RuO_2$ coating can be chemically or electrochemically modified using established techniques for metal-oxide functionalization. The method and material provide opportunities for transparent conductors without some of the limitations of current transparent conductors.

By preparing an established metallic conducting oxide as an ultrathin layer, transparent conducting material, unique properties may be made. A chemically synthesized $RuO_2$ film has numerous advantages in terms of its properties and synthesis. Although not extensively studied as a transparent conductor (Hara et al., *Electrochemistry* 70 (2002) 13-17), $RuO_2$ is a well-established and technologically important electronic and electrocatalytic material with structure-dependent properties that can be tuned for applications such as electrolysis, electrocatalysis, electrochemical energy storage, and thick and thin film resistors (Adams et al., *J. Phys. Chem. B* 107 (2003), 6668-6697). High electronic conductivity occurs for single crystal and polycrystalline $RuO_2$, whereas electrocatalytic behavior is most common in defective forms of ruthenia, which are generally hydrous and contain varying amounts of structural disorder at both the surface and within the bulk ($RuO_2 \cdot xH_2O$ or $RuO_xH_y$).

The electroless deposition protocol of US Patent Application Publication No. 2009/0092834 can be extended to the deposition of self-limiting, ultrathin (2-3 nm) $RuO_2$ coatings on planar substrates, particularly those that are themselves transparent in specific regions of the electromagnetic spectrum (ultraviolet (UV), visible, infrared (IR), terahertz (THz)). Examples of 2-D insulating substrates that have been coated with nanometric skins of $RuO_2$ include $CaF_2$ windows, silicon wafers, and glass and quartz slides. Spectroscopic studies of the resulting ultrathin $RuO_2$ films indicate that they exhibit high transmission (>80%) and a nearly featureless absorption background across a broad spectral range, from the UV and visible to the far-IR, while simultaneously exhibiting electrical conductivities of ~$10^3$ S cm$^{-1}$. The conductive $RuO_2$ films are electrochemically addressable and can be modified using either electroless or electrodeposition methods, e.g., electrodeposition of a thin film of the inorganic metal-cyanide dye Prussian Blue. The spectral features of such additional coatings can be assessed in transmission measurement mode from the visible to mid-IR range by virtue of the transparency and flat, invariant response of the underlying $RuO_2$ in those spectral regions.

Ultrathin (2-10 nm), conformal $RuO_2$ films can be transparent over a wide spectral range, from the ultraviolet to terahertz regions, while simultaneously exhibiting high electrical conductivity (~1000 S cm$^{-1}$) produced with a simple and versatile chemical method capable of yielding uniform thickness coatings on simple and complex dielectric and insulating substrates. A unique aspect of the material relates to its inherent electrical conductivity as a result of the metallic properties of $RuO_2$ as well as the unique conduction properties of this particular type of $RuO_2$ produced by subambient thermal decomposition of ruthenium tetroxide following by heating. As a result—and in contrast to typical conducting oxides such as ITO—no doping is required to impart conductivity, which greatly simplifies the synthesis and permits it to be used in a wide range of applications, such as for complex, non-planar, non-line-of-sight, or structured substrates. Another consequence is that optical transparency spans a broad spectra range, from the UV through the near and mid-infrared to the THz range. In addition, the material can be functionalized using standard methods for oxide surfaces. One unique capability is to coat insulating surfaces with a transparent conducting layer for subsequent electrochemical deposition or transmission optical diagnostics, such as those that would be of relevance to fuel cells, batteries, electrochromic devices, and photovoltaic devices.

The substrate may be any surface on which the $RuO_2$ may be deposited, including but not limited to a $CaF_2$ substrate, a silicon wafer, a planar substrate, an insulating substrate, a nonporous substrate, or a transparent or non-opaque substrate. A non-opaque (or not opaque) substrate is one that has at least a desired minimum % transmission (such as 50%, 60%, 70%, 80%, or 90%) at one or more desired wavelengths, including a broad wavelength range such as the entire visible, UV, and/or IR spectral regions. When the $RuO_2$ is being used for its conductive properties without regard for its transparency, an opaque substrate such as silicon may used. The substrate need not be planar as long as the portion desired to be coated can be in contact with the $RuO_4$ solution when the substrate is immersed. The resulting $RuO_2$ coating can conform to such a nonplanar substrate.

The $RuO_2$ coating may be made, for example, according to methods disclosed in Ryan et al., *Nature* 406 (2000) 169-172); Chervin et al., *Nano Lett.* 9 (2009) 2316-2321; and US Patent Application Publication No. 2009/0092834. Ruthenium tetroxide ($RuO_4$) is extracted into a nonaqueous solution, which may be kept chilled at all times to avoid premature decomposition of the $RuO_4$. The chilling may be, for example, by a dry ice/acetone bath. The substrate may also be chilled or not chilled when it is placed in the solution. As the solution warms to ambient or room temperature, the $RuO_4$ decomposes to $RuO_2$ and deposits on the substrate in the form of nanoparticles. The nanoparticles may form an electrically connected network of nanoparticles.

After deposition of $RuO_2$, the substrate may be heated to improve the conductive or transparency properties of the coating. Disordered $RuO_2$ may be formed, for example, at 150° C. to 250° C. Heating to higher temperatures may produce X-ray-diffraction-observable rutile $RuO_2$, which may be less transparent and have a lower conductivity in such a thin coating. The particles may separate from each other during a conversion to rutile form, causing a loss of electrical connectivity within the coating. The heating may be performed in, for example, oxygen or air.

The $RuO_2$ may be, for example, no more than 10-nm thick. A single layer made by the method disclosed herein may be only 2-3 nm thick. The process may be repeated multiple times to produce a thicker layer. The coating may be a single-component coating as opposed to a composite, and may comprise, for example, at least 90%, 95%, or 99% $RuO_2$ by weight.

The transparency of the coating may be defined by its optical density (OD). It may have a low OD across a wide range of frequencies. For example, the range of frequencies may be from 600 nm, 1 μm, or 10 μm up to 100 μm or 600 μm (0.5 THz). For a single layer of $RuO_2$, the OD across the entire range may be as low as 0.1, 0.2, 0.3, or 0.5. The OD of the coating may be determined by measuring the OD of the coated substrate and subtracting the OD of the uncoated substrate. The OD may increase linearly with multiple deposited layers of $RuO_2$, such that the OD of the coating is no more than 0.1, 0.2, 0.3, or 0.5 times the number of layers. If the substrate is coated on both sides, then the number of layers is double the number of times the coating method is performed. The OD may tend to increase at wavelengths shorter than 600 nm. However, for example, the OD at 225 nm, or other wavelengths in the UV or near-UV spectra, may be no more than two, three, five, or ten times the OD at 600 nm.

The coating may have a low resistivity. When the coating has a single layer of $RuO_2$, it may have a sheet resistance of, for example less than $1000\Omega$, $1500\Omega$, or $5000\Omega$. Multi-layer coatings generally have a lower sheet resistance.

The following examples are given to illustrate specific applications. These specific examples are not intended to limit the scope of the disclosure in this application.

EXAMPLE 1

Synthesis and characterization of $RuO_2$ films—Ruthenium oxide coatings were prepared via the decomposition of $RuO_4$ from organic solutions. To prepare the precursor solution, multiple aliquots of petroleum ether, pre-chilled for 1 min in a dry ice/acetone bath, are used to extract $RuO_4$ from an aqueous solution pre-chilled to T<5° C. (0.5 wt % solution, Strem Chemicals). After phase transfer, each aliquot of the nonaqueous precursor solution is rapidly mixed with a few milligrams of $MgSO_4$ (or other desiccant in order to remove water) for every milliliter of aliquot, passed through a coarse filter, and collected in a flask held in a dry ice/acetone bath. The nonaqueous solution (from the combined aliquots) is then thermally equilibrated in an aqueous ice bath and decanted into a pre-chilled (aqueous ice bath) glass vial containing the substrate of interest (e.g., calcium fluoride windows, quartz slides, glass slides, silicon wafers, titanium foil) immersed in a sufficient volume of petroleum ether. The capped vial is then removed from the bath and held at room temperature overnight (~15 h), after which a faint brown/black coating is observed. The $RuO_2$-modified substrates are then rinsed with several aliquots of petroleum ether while sonicating followed by drying for several hours in air.

The resulting as-deposited $RuO_2$ film has modest conductivity, as measured by two-probe DC methods. The film conductivity can be increased by several orders of magnitude by heating in air or $O_2$ to temperatures between ~150 and 250° C. After such heat treatments, the $RuO_2$ film conductivities are on the order of $10^3$ S cm$^{-1}$. The thickness for the $RuO_2$ coatings produced on the various 2-D transparent substrates is estimated to be similar to those previously produced on silica paper (at ~3 nm). It has been demonstrated that additional layers of $RuO_2$ can be deposited by subsequent deposition steps, with each layer adding another ~3 nm of $RuO_2$, with a corresponding proportional increase in the optical density of the film while retaining a flat, invariant background.

EXAMPLE 2

Figure 4:
FIG. 4 shows a picture (top) and absorption spectrum (bottom) of Prussian Blue electrodeposited on half of a $RuO_2$-coated $CaF_2$ window.
Figure 4:
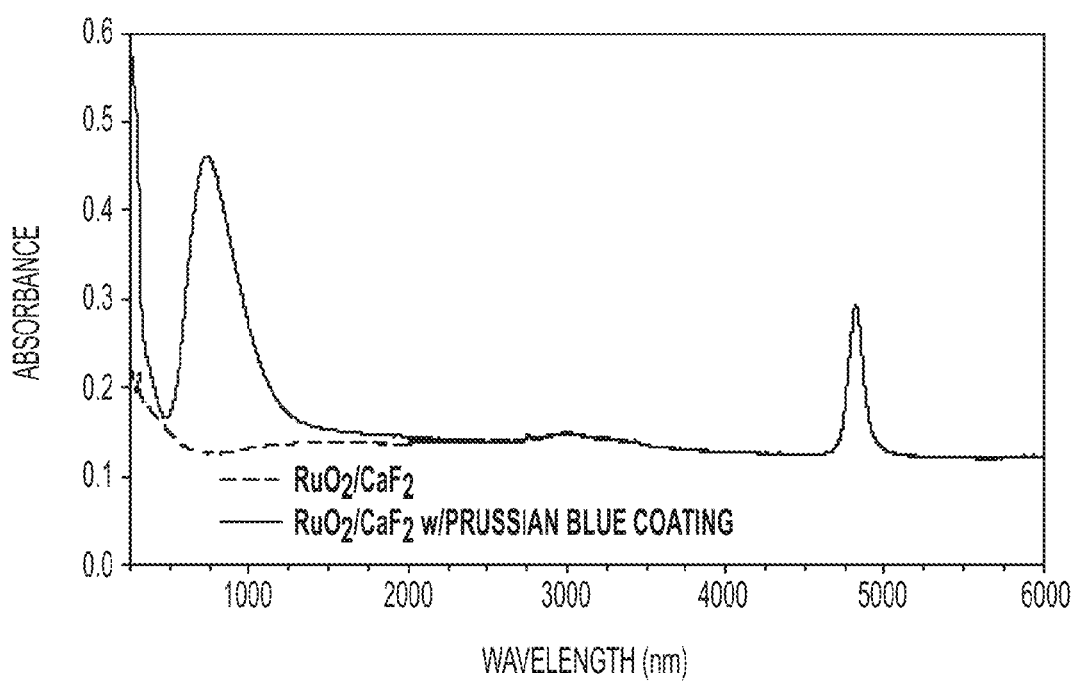
Figure 5:
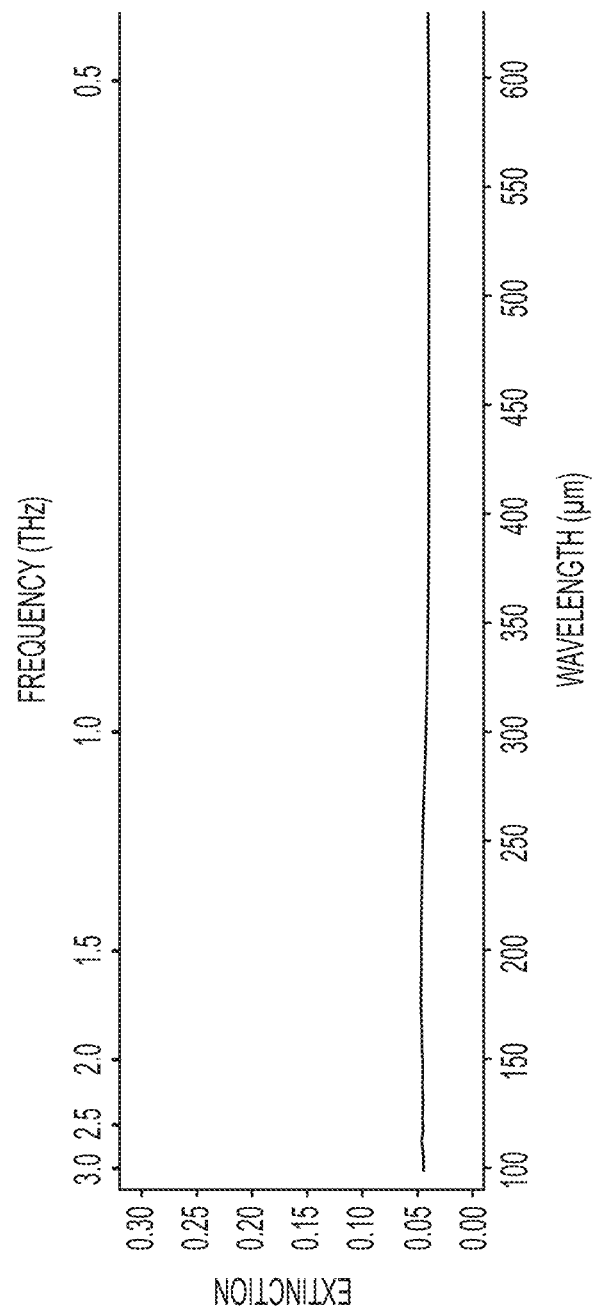
FIG. 5 shows Terahertz extinction (equal to $\log(1/T)$) spectrum for a single layer of $RuO_2$ on a silicon substrate as measured by terahertz time-domain spectroscopy (THz-TDS).

Optical properties of $RuO_2$ films—The optical properties of thin $RuO_2$ films were determined by transmission measurements on flat $CaF_2$ (for UV to mid-IR using frequency domain transmission) and semi-insulating silicon substrates (for the THz region using THz-TDS). Spectroscopic measurements were carried out for one, two, and three layers of $RuO_2$, typically after first heating each layer of the films to 200° C. to maximize conductivity. The optical density increased irreversibly (i.e., transmission decreased and extinction increased) when the coated substrate is heated, which is expected based on the increased electrical conductivity of the $RuO_2$ ultrathin film upon heating. Transmission of the $RuO_2$ film on $CaF_2$ measured in the frequency domain exhibits high, spectrally flat transmission; it is on the order of 50% (log(1/T)=OD ~0.3) for a single layer (both front and back sides coated) with little variation (<30% variation of OD between 0.3 and 0.4) from 250 nm in the UV to 10 µm in the infrared, where the long wavelength is limited by the $CaF_2$ substrate transmission. Transmission of the $RuO_2$ films on Si was measured to longer wavelengths, in the THz region (a region a.k.a. far infrared, specifically in the 0.5 to 3.5 THz window, which is down to ~15 cm$^{-1}$ and found to be similar (<0.5 OD for two layers) to that in the UV—near IR. An estimate of the complex conductivity in the THz window was determined using THz-TDS and following an established procedure (Walther et al., *Phys. Rev. B* 76 (2007) 125408). Assuming a film thickness of 3 nm, the real part of the conductivity is approximately constant in the THz window with an average value of ~3000$\Omega^{-1}$ cm$^{-1}$. The spectral dependence of $RuO_2$ on $CaF_2$ is quite different than previously reported optical properties (Hones et al., *Appl. Phys. Lett.* 67 (1995) 3078-3080; de Almeid et al., *Phys. Rev. B.* 73 (2006) 165102) for films of bulk $RuO_2$ prepared by MOCVD in which there is a substantially higher extinction (using reported values of reflectivity) in the near-IR than in the visible. In order to demonstrate that the material is suitably conductive for electrodeposition, Prussian Blue was electrodeposited (using $RuO_2(CaF_2)$ as the working electrode for deposition and applying constant current conditions of 50 µA cm$^{-2}$ for 300 s) onto a single layer of $RuO_2$ previously deposited on a standard $CaF_2$ window. The Prussian-Blue-coated $RuO_2(CaF_2)$ window visibly expressed the characteristic blue color of the dye as a result of the broad visible band near 700 nm and the Fourier-transform IR (FTIR) spectrum clearly showed the expected cyanide vibration as a band in the infrared near 2000 cm$^{-1}$) (FIG. 4).

Obviously, many modifications and variations are possible in light of the above teachings. It is therefore to be understood that the claimed subject matter may be practiced otherwise than as specifically described. Any reference to claim elements in the singular, e.g., using the articles "a," "an," "the," or "said" is not construed as limiting the element to the singular.

What is claimed is:

1. An article comprising:
   a substrate; and
   a $RuO_2$ coating on a portion of the substrate;
      wherein the coating comprises nanoparticles of $RuO_2$;
      wherein the nanoparticles are 2 to 3 nm in size; and
      wherein the coating is no more than 10 nm thick.

2. The article of claim 1, wherein the substrate is planar.

3. The article of claim 1, wherein the substrate is not opaque.

4. The article of claim 1, wherein the substrate is electrically insulating.

5. The article of claim 1;
   wherein the coating comprises one or more layers of $RuO_2$; and
   wherein the coating has an optical density of no more than 0.5 per layer at all wavelengths from 250 nm to 600 µm.

6. The article of claim 1, wherein the optical density of the coating at 225 nm is no more than three times the optical density at 600 nm.

7. The article of claim 1, wherein the coating comprises a single layer of $RuO_2$ having a sheet resistance of less than 1500 Ω/sq.

8. The article of claim 1, wherein the coating comprises at least 90% $RuO_2$.

* * * * *